United States Patent [19]
Anthon et al.

[11] Patent Number: 4,933,947
[45] Date of Patent: Jun. 12, 1990

[54] FREQUENCY CONVERSION OF OPTICAL RADIATION

[75] Inventors: Douglas W. Anthon, Wheaton; Donald L. Sipes, Jr., Lisle, both of Ill.

[73] Assignee: Amoco Corporation, Chicago, Ill.

[21] Appl. No.: 353,870

[22] Filed: May 18, 1989

Related U.S. Application Data

[63] Continuation-in-part of Ser. No. 207,666, Jun. 16, 1988, which is a continuation-in-part of Ser. No. 157,741, Feb. 18, 1988.

[51] Int. Cl.$^5$ .............................................. H01S 3/04
[52] U.S. Cl. ...................................... 372/34; 372/21; 372/94
[58] Field of Search ...................... 372/34, 21, 22, 75, 372/69, 94

[56] References Cited

U.S. PATENT DOCUMENTS

| | | | |
|---|---|---|---|
| 4,656,635 | 4/1987 | Baer et al. | 372/21 |
| 4,730,335 | 3/1988 | Clark et al. | 372/21 |
| 4,731,795 | 3/1988 | Clark et al. | 372/21 |
| 4,809,291 | 2/1989 | Byer et al. | 372/21 |

Primary Examiner—Léon Scott, Jr.
Attorney, Agent, or Firm—Richard A. Kretchmer; William H. Magidson; Ralph C. Medhurst

[57] ABSTRACT

An intracavity frequency-modified laser of improved amplitude stability is obtained by substantially eliminating spatial hole burning in the lasant material and maintaining the optical cavity of the laser at a temperature which results in substantially noise-free generation of output radiation.

22 Claims, 2 Drawing Sheets

FREQUENCY CONVERSION OF OPTICAL RADIATION

CROSS-REFERENCE TO RELATED APPLICATIONS

This application is a continuation-in-part of application Ser. No. 207,666, filed June 16, 1988, which in turn is a continuation-in-part of application Ser. No. 157,741, filed Feb. 18, 1988.

FIELD OF THE INVENTION

This invention relates to the conversion of optical radiation of one frequency into optical radiation of another frequency by interaction with nonlinear optical material within an optical cavity. More particularly, it relates to a method for improving the amplitude stability of the frequency modified radiation from such a process.

BACKGROUND OF THE INVENTION

A laser is a device which has the ability to produce monochromatic, coherent light through the stimulated emission of photons from atoms, molecules or ions of an active medium which have typically been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of substantially identical energy from other excited atoms, molecules or ions. As a consequence, the initial photon creates a cascade of photons between the reflecting surfaces of the optical cavity which are of substantially identical energy and exactly in phase. A portion of this cascade of photons is then discharged out of the optical cavity, for example, by transmission through one or more of the reflecting surfaces of the cavity. These discharged photons constitute the laser output.

Excitation of the active medium of a laser can be accomplished by a variety of methods. However, the most common methods are optical pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes (as used herein, this term includes superluminescent diodes and superluminescent diode arrays) and laser diodes (as used herein, this term includes laser diode arrays) to optically pump or excite a solid lasant material is well-known. Lasant materials commonly used in such solid state lasers include crystalline or glassy host materials into which an active material, such as trivalent neodymium ions, is incorporated. Highly suitable solid lasant materials include substances wherein the active material is a stoichiometric component of the lasant material. Such stoichiometric materials include, for example, neodymium pentaphosphate and lithium neodymium tetraphosphate. Detailed summaries of conventional solid lasant materials are set forth in the *CRC Handbook of Laser Science and Technology*, Vol. I, M. Weber, Ed., CRC Press, Inc., Boca Raton, Fla., 1982, pp. 72–135 and by A. A. Kaminskii in *Laser Crystals*, Vol. 14 of the Springer Series in Optical Sciences, D. L. MacAdam, Ed., Springer-Verlag, New York, N.Y., 1981. Conventional host materials for neodymium ions include glass, yttrium aluminum garnet ($Y_3Al_5O_{12}$, referred to as YAG), $YAlO_3$ (referred to as YALO), $LiYF_4$ (referred to as YLF), and gadolinium scandium gallium garnet ($Gd_3Sc_2Ga_3O_{12}$) referred to as GSGG. By way of example, when neodymium-doped YAG is employed as the lasant material in an optically pumped solid state laser, it can be pumped by absorption of light having a wave-length of about 808 nm and can emit light having a wave-length of 1064 nm.

U.S. Pat. No. 3,624,545 issued to Ross on Nov. 30, 1971, describes an optically pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on Sept. 21, 1976. Finally, D. L. Sipes, *Appl. Phys. Lett.*, Vol. 47, No. 2, 1985, pp. 74–75, has reported that the use of a tightly focused semiconductor laser diode array to end pump a neodymium-doped YAG results in a high efficiency conversion of pumping radiation having a wavelength of 810 nm to output radiation having a wavelength of 1064 nm.

Materials having nonlinear optical properties are well-known. For example, U.S. Pat. No. 3,949,323 issued to Bierlein et al. on Apr. 6, 1976, discloses that nonlinear optical properties are possessed by materials having the formula $MTiO(XO_4)$ where M is at least one of K, Rb, Tl and $NH_4$; and X is at least one of P or As, except when $NH_4$ is present, then X is only P. This generic formula includes potassium titanyl phosphate, $KTiOPO_4$, a particularly useful nonlinear material. Other known nonlinear optical materials include, but are not limited to, $KH_2PO_4$, $LiNbO_3$, $KNbO_3$, $\beta$-$BaB_2O_4$, $Ba_2NaNb_5O_{15}$, $LiIO_3$, $HIO_3$, $KB_5O_8 \cdot 4H_2O$, potassium lithium niobate and urea. A review of the nonlinear optical properties of a number of different uniaxial crystals has been published in *Sov. J. Quantum Electron.*, Vol. 7, No. 1, Jan. 1977, pp. 1–13. Nonlinear optical materials have also been reviewed by S. Singh in the *CRC Handbook of Laser Science and Technology*, Vol. III, M. J. Weber, Ed., CRC Press, Inc., Boca Raton, Fla., 1986, pp. 3–228.

The conversion of optical radiation of one frequency to optical radiation of another frequency through interaction with a nonlinear optical material is well-known and has been extensively studied. Examples of such conversion include harmonic generation, optical mixing and parametric oscillation. Second-harmonic generation or "frequency doubling" is perhaps the most common and important example of nonlinear optics wherein part of the energy of an optical wave of angular frequency $\omega$ propagating through a nonlinear optical crystal is converted to energy of a wave of angular frequency $2\omega$. Second-harmonic generation has been reviewed by A. Yariv in *Quantum Electronics*, Second Ed., John Wiley & Sons, New York, 1975 at pages 407–434 and by W. Koechner in *Solid State Laser Engineering*, Springer-Verlag, New York, 1976 at pages 491–524.

Electromagnetic waves having a frequency in the optical range and propagating through a nonlinear crystal induce polarization waves which have frequencies equal to the sum and difference of those of the exciting waves. Such a polarization wave can transfer energy to an electromagnetic wave of the same frequency. The efficiency of energy transfer from a polarization wave to the corresponding electromagnetic wave is a function of: (a) the magnitude of the second order polarizability tensor, since this tensor element determines the amplitude of the polarization wave; and (b) the distance over which the polarization wave and the radiated electromagnetic wave can remain sufficiently in phase.

The coherence length, $l_c$, is a measure of the phase relationship between the polarization wave and the radiated wave which is given by the following relationship:

$$l_c = \pi/\Delta k$$

where $\Delta k$ is the difference between the wave vectors of the polarization and electromagnetic waves. More specifically, the coherence length is the distance from the entrance surface of the nonlinear optical crystal to the point at which the power of the radiated electromagnetic wave will be at its maximum value. Phase-matching occurs when $\Delta k = 0$. The condition $\Delta k = 0$ can also be expressed as $n_3\omega_3 = n_1\omega_1 \pm n_2\omega_2$ where $\omega_3 = \omega_1 \pm \omega_2$; $\omega_1$ and $\omega_2$ are the frequencies of the input electromagnetic waves; $\omega_3$ is the frequency of the radiated electromagnetic wave; and $n_1$, $n_2$ and $n_3$ are the refractive indices of the respective waves in the nonlinear optical crystal. In the special case of second harmonic generation, there is incident radiation of only one frequency, $\omega$, so that $\omega_1 = \omega_2 = \omega$ and $\omega_3 = 2\omega$.

For appreciable conversion of optical radiation of one frequency to optical radiation of another frequency in a nonlinear optical crystal, the interacting waves must stay substantially in phase throughout the crystal so that:

$$|\Delta k| = |k_3 - k_1 - k_2| < 2\pi/1$$

where $k_1$, $k_2$ and $k_3$ represent the wave numbers corresponding to radiation of frequencies $\omega_1$, $\omega_2$ and $\omega_3$, respectively, and 1 is the interaction length in the nonlinear material. The term "substantially phase-matched," as used herein, means that $|\Delta k| < 2\pi/1$ for a given nonlinear optical crystal.

A conventional method for achieving phase-matching in a nonlinear optical material utilizes the fact that dispersion (the change of refractive index with frequency) can be offset by using the natural birefringence of uniaxial or biaxial crystals. Such crystals have two refractive indices for a given direction of propagation which correspond to the two allowed orthogonally polarized propagation modes. Accordingly, by an appropriate choice of polarization and direction of propagation, it is often possible to achieve phase-matching in a birefringent nonlinear optical crystal. The term "phase-match axis," as used herein, refers to a line or direction through a nonlinear optical crystal along which the substantially phase-matched conversion of a stated input radiation into a stated output radiation is permitted for at least certain polarizations of said input radiation.

Phase-matching is generally of either Type I or Type II. Type I phase-matching requires that the incident waves interacting in the nonlinear optical material have the same polarization. Type II phase-matching requires that the incident waves interacting in the nonlinear optical material have orthogonal polarizations.

Second harmonic generation within the cavity of a multilongitudinal mode laser by an intracavity doubling crystal has recently been analyzed by T. Baer, *J. Opt. Soc. Am. B*, Vol. 3, No. 9, pp. 1175–1180 (1986). This report sets forth an experimental and theoretical evaluation of the output of a Nd:YAG laser which is pumped by a laser diode array and contains an intracavity doubling crystal. It is reported that large amplitude fluctuations and longitudinal mode instabilities result when the doubling crystal is inserted into the laser cavity. However, it is also reported that these instabilities disappear when the laser is restricted to a single oscillating mode by an intracavity etalon. Further analysis of amplitude instability in a multilongitudinal mode intracavity-doubled laser has been reported by X. G. Wu et al., *J. Opt. Soc. Am. B*, Vol. 4, No. 11, pp. 1870–1877 (1987) and M. Oka et al., *Optics Letters*, Vol. 13, No. 10, pp. 805–807 (1988).

U.S. Pat. Nos. 4,656,635 (Apr. 7, 1987) and 4,701,929 (Oct. 20, 1987), both issued to Baer et al., disclose a laser diode-pumped, intracavity frequency-doubled, solid state laser. In these patents, it is stated that a problem with such devices is the generation of amplitude noise, including large amplitude spikes, which prevent or limit use in applications requiring a highly stable or constant output. It is further stated that this noise results from the combination of multiple longitudinal modes. However, it is disclosed that such noise can be reduced or eliminated by inserting an etalon into the laser cavity and thereby forcing the laser to operate in a single mode. It is also disclosed that it may be possible to reduce this noise by mode locking the laser. It is further disclosed that amplitude fluctuations in such a device can be eliminated by eliminating spatial hole burning in the active medium, for example, by utilizing a ring laser cavity geometry or placing the active medium between quarter-wave plates.

SUMMARY OF THE INVENTION

The present invention is directed to a method for reducing or eliminating the amplitude fluctuations (noise) that can appear in the output of a laser upon the insertion of a nonlinear optical crystal into the laser cavity. Such noise is highly undesirable if the output radiation of such a laser is to be used in applications such as optical storage of data, spectroscopy, communications, projection displays, laser printing and laser film read/write systems.

In a solid state laser which is frequency modified by intracavity nonlinear optical means, we have found that the elimination of spatial hole burning in the lasant material is a partial but not sufficient measure for eliminating amplitude noise in the frequency modified output radiation from the device. More specifically, we have found that the noise content of the output from such a device drops essentially to zero over certain well-defined temperature ranges or "temperature windows." Accordingly, we have discovered that substantially noise-free operation can be achieved by maintaining the temperature of the laser cavity at a value within such a temperature window.

One embodiment of the invention is an apparatus for generating coherent optical radiation which comprises: (a) an optical cavity for optical radiation of a first frequency; (b) solid lasant material disposed within said cavity for generating coherent optical radiation of said first frequency; (c) means for substantially eliminating spatial hole burning in the lasant material during said generation of optical radiation of a first frequency; (d) nonlinear optical means within the optical cavity for converting said optical radiation of a first frequency into coherent optical radiation of a second frequency; and (e) temperature control means for maintaining the temperature of said optical cavity at a value which results in substantially noise-free generation of said radiation of a second frequency.

Another embodiment of the invention is an optically pumped solid state laser comprising: (a) an optical cavity for optical radiation of a first frequency; (b) optical pumping means for generating optical pumping radiation which comprises a laser diode; (c) solid lasant material which is disposed within said optical cavity, positioned to receive pumping radiation from said optical pumping means, and effective for generating coherent optical radiation of said first frequency upon receiving said pumping radiation; (d) means for substantially eliminating spatial hole burning in the lasant material during said generation of optical radiation of a first frequency; (e) nonlinear optical means within the optical cavity for converting said optical radiation of a first frequency into coherent optical radiation of a second frequency; and (f) temperature control means for maintaining the temperature of said optical cavity at a value which results in substantially noise-free generation of said radiation of a second frequency.

A further embodiment of the invention is a method for generating coherent optical radiation which comprises: (a) generating coherent optical radiation of a first frequency from solid lasant material within an optical cavity for said radiation of a first frequency; (b) substantially preventing spatial hole burning in the lasant material during said generation of radiation of a first frequency with spatial hole burning suppression means; (c) converting said optical radiation of a first frequency into coherent optical radiation of a second frequency within said optical cavity with nonlinear optical means; (d) withdrawing said optical radiation of a second frequency from said optical cavity as output radiation; and (e) maintaining the temperature of said optical cavity within a range over which said output radiation is substantially noise-free.

An object of the invention is to provide a laser of improved amplitude stability which is frequency modified by intracavity nonlinear optical means.

Another object of the invention is to provide a multilongitudinal-mode, optically-pumped, intracavity-doubled solid state laser of improved amplitude stability.

Another object of the invention is to provide a diode-pumped, intracavity-doubled, multilongitudinal-mode, solid state laser of improved output stability.

A further object of the invention is to provide a method for reducing the amplitude instabilities that are observed in the output of a laser when a nonlinear optical material is inserted into the laser cavity.

A still further object of the invention is to provide a method for improving the amplitude stability of an intracavity frequency-doubled laser.

DETAILED DESCRIPTION OF THE PREFERRED EMBODIMENTS

Figure 1:
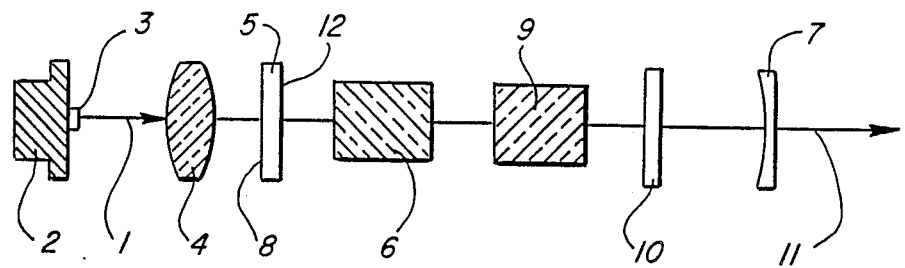
FIG. 1 of the drawings is a schematic representation of one embodiment of the invention.
Figure 3:
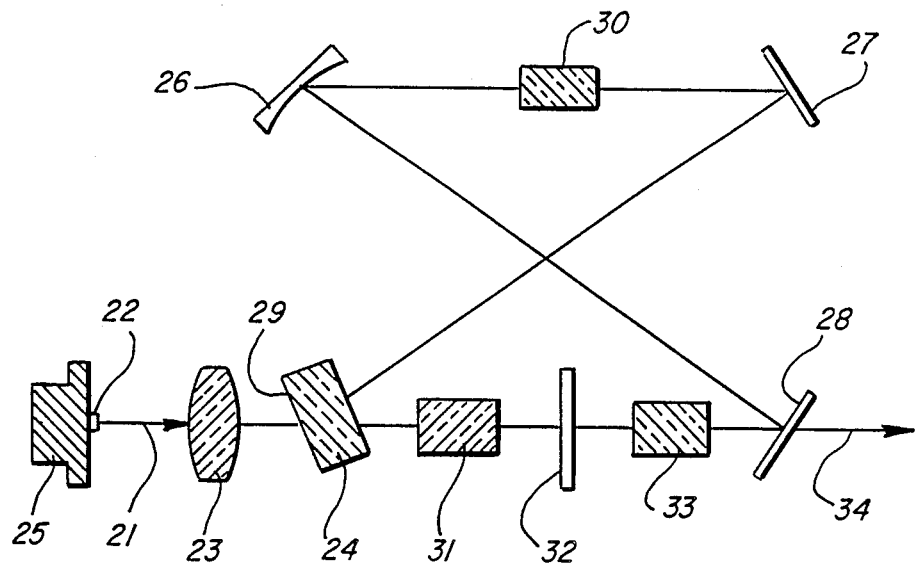
FIG. 3 of the drawings is a schematic representation of a second embodiment of the invention.

While this invention is susceptible of embodiment in many forms, there are schematically shown in FIGS. 1 and 3 of the drawings two specific embodiments, with the understanding that the present disclosure is not intended to limit the invention to the embodiments illustrated.

With reference to FIG. 1, optical pumping radiation 1 from optical pumping means 2 and 3 is focused by focusing means 4 through quarter-wave plate 5 and into solid lasant material 6 which is capable of being pumped by the radiation from said pumping means (2 and 3). Light emitted by the lasing of lasant material 6 is contained within the linear standing wave optical cavity defined by mirror 7 and a suitable reflective coating on surface 8 of quarter-wave plate 5, and such light is hereinafter referred to as cavity radiation. The cavity radiation can be single longitudinal mode in character or it can be comprised of two or more longitudinal modes. Nonlinear optical crystal 9 is positioned within the optical cavity in such a manner that cavity radiation circulating within the optical cavity can interact with the crystal along a phase-match axis for the conversion of cavity radiation into radiation which is a harmonic thereof. A second quarter-wave plate 10 is positioned between nonlinear optical crystal 9 and mirror 7 for interaction with the cavity radiation. The pair of quarter-wave plates 5 and 10 serves to suppress spatial hole burning within lasant material 6. Harmonic radiation is generated upon interaction of the cavity radiation with nonlinear optical crystal 9 and is passed through mirror 7 as output radiation 11. Finally, the laser illustrated in FIG. 1 is provided with temperature control means (which is not shown in the figure) for adjusting and controlling the temperature of the laser's optical cavity and its contents.

Optical pumping means 2 and 3 can comprise any conventional source of optical pumping radiation. However, preferred sources of pumping radiation 1 include light-emitting diodes and laser diodes. Such diodes are commonly attached to a heat-resistant and thermally conductive heat sink and are packaged in a metal housing. For efficient operation, the pumping radiation 1 is matched with a suitable absorption band of the lasant material 6. Conventional light-emitting diodes and laser diodes are available which, as a function of composition, produce output radiation having a wavelength over the range from about 630 nm to about 1600 nm, and any such device producing pumping radiation 1 of a wavelength effective to pump lasant material 6 can be used in the practice of this invention. For example, the wavelength of the output radiation from a GaInP based device can be varied from about 630 to about 700 nm by variation of the device composition. Similarly, the wavelength of the output radiation from a GaAlAs based device can be varied from about 750 to about 900 nm by variation of the device composition, and InGaAsP based devices can be used to provide radiation in the wavelength range from about 1000 to about 1600 nm.

A highly suitable source of optical pumping radiation 1 consists of a gallium aluminum arsenide laser diode array 3, emitting light having a wavelength of about 810 nm, which is attached to heat sink 2. Heat sink 2 can be passive in character. However, heat sink 2 can also comprise a thermoelectric cooler to help maintain laser diode array 3 at a constant temperature and thereby ensure optimal operation of laser diode array 3 at a constant wavelength. It will be appreciated, of course, that during operation the optical pumping means will be attached to a suitable power supply. Electrical leads from laser diode array 3 which are directed to a power supply are not illustrated in FIG. 1.

Focusing means 4 serves to focus pumping radiation 1 through quarter-wave plate 5 and into lasant material 6. This focusing results in a high pumping intensity and an associated high photon to photon conversion efficiency in lasant material 6. Focusing means 4 can comprise any conventional means for focusing light such as a gradient index lens, a ball lens, an aspheric lens or a combination of lenses.

Any conventional solid lasant material 6 can be utilized provided that it is capable of being optically pumped by the optical pumping means selected. Suitable lasant materials include, but are not limited to, solids selected from the group consisting of glassy and crystalline host materials which are doped with an active material and substances wherein the active material is a stoichiometric component of the lasant material. Highly suitable active materials include, but are not limited to, ions of chromium, titanium and the rare earth metals. Highly suitable lasant materials include neodymium-doped YAG, neodymium-doped YALO, neodymium-doped YLF, neodymium-doped GSGG, neodymium pentaphosphate and lithium neodymium tetraphosphate. By way of specific example, neodymium-doped YAG is a highly suitable lasant material 6 for use in combination with an optical pumping means which produces light having a wavelength of about 810 nm. When pumped with light of this wavelength, neodymium-doped YAG can emit light having a wavelength of 1064 nm.

The precise geometric shape of lasant material 6 can vary widely. For example, lasant material 6 can be rod-shaped, or rhombohedral in shape if desired, and lensshaped surfaces can be used if desired. If desired, an end-pumped fiber of lasant material can be used. Highly suitable fibers for this purpose include, but are not limited to, glass optical fibers which are doped with ions of a rare earth metal such as neodymium. The length of such a fiber is easily adjusted to result in absorption of essentially all of the optical pumping radiation 1. If a very long fiber is required, it can be coiled, on a spool for example, in order to minimize the overall length of the laser of this invention.

The reflective coating on surface 8 of quarter-wave plate 5 is selected in such a manner that it is substantially transparent to optical pumping radiation 1 but highly reflective with respect to the cavity radiation produced by the lasing of lasant material 6. In a preferred embodiment, this coating will also be highly reflective of the harmonic output radiation 11. High reflectivity of the coating for this harmonic radiation will serve to prevent the pump-side loss of any harmonic radiation which is produced upon the reflection of cavity radiation into nonlinear optical crystal 9 by mirror 7. Such a coating is conventional in character and can, for example, be a dielectric coating which produces an appropriate high reflection and phase shift of the reflected radiation.

Mirror 7 is selected in such a manner that it is highly reflective for the cavity radiation produced by the lasing of lasant material 6 but substantially transparent to output radiation 11 which is generated by the interaction of cavity radiation with nonlinear optical crystal 9. Mirror 7 is conventional in character and, for example, can comprise any suitable conventional coating on any suitable substrate.

Cavity radiation can be either single mode in character or it can be comprised of two or more longitudinal modes of substantially the same frequency. Unless the mode structure is expressly specified, reference herein to the cavity radiation as having a specific frequency will be understood to include all of the longitudinal modes of substantially the same frequency which are generated by the lasant material and supported within the optical cavity. Similarly, reference herein to frequency-modified radiation resulting from interaction of cavity radiation with the nonlinear optical material as having a specific frequency will be understood to include the combination of similar frequencies resulting from frequency-modification of any plurality of longitudinal modes in the cavity radiation. A preferred embodiment of the invention involves the use of multilongitudinal-mode cavity radiation in the laser which is illustrated in FIG. 1.

The pair of quarter-wave plates 5 and 10 are quarter-wave plates for cavity radiation and serve as a means for substantially eliminating spatial hole burning in lasant material 6 by causing circular polarization of the cavity radiation and thereby creating a twisted mode optical cavity [the twisted mode technique for producing an axially uniform energy density in a laser cavity is described by V. Evtuhov et al., *Appl. Optics*, Vol. 4, No. 1, pp. 142–143 (1965)]. The precise location of these two quarter-wave plates within the optical cavity is not critical, provided that lasant material 6 is placed between them. However, a preferred embodiment of the invention involves placing both lasant material 6 and nonlinear optical material 9 between the pair of quarter-wave plates 5 and 10 as illustrated in FIG. 1.

Any conventional means for substantially eliminating spatial hole burning in the lasant material can be used in the practice of this invention. For example, spatial hole burning can be eliminated through the use of a travelingwave ring-like optical cavity (which is illustrated by the embodiment set forth in FIG. 3), by generating circularly polarized light in the lasant material (which is illustrated in FIG. 1 and is effected by the pair of quarter-wave plates 5 and 10), with mechanical motion, or with electro-optic phase modulation.

Cavity radiation circulating within the optical cavity defined by mirror 7 and the reflective coating on surface 8 of quarter-wave plate 5 is directed into nonlinear optical crystal 9 along a phase-match axis of the crystal that permits efficient conversion of cavity radiation to the desired harmonic.

The geometric shape of the nonlinear optical crystal used in the practice of this invention can vary widely.

For example, the crystal can be rod-shaped or rhombohedral in shape, and the crystal can have lens-shaped surfaces if desired. When possible, noncritical phase-matching is usually preferred in order to minimize the effects of beam divergence and "walk-off."

Potassium titanyl phosphate, $KTiOPO_4$, is a highly preferred nonlinear optical material. However, it will be appreciated that any nonlinear optical material can be utilized in the practice of this invention. Suitable nonlinear optical materials include, but are not limited to, $KH_3PO_4$, $LiNbO_3$, $KNbO_3$, $\beta\text{-}BaB_2O_4$, $Ba_2NaNb_5O_{15}$, $LiIO_3$, $HIO_3$, $KB_5O_8 \cdot 4H_2O$, potassium lithium niobate, urea and compounds of the formula $MTiO(XO_4)$ where M is selected from the group consisting of K, Rb and Tl, and X is selected from the group consisting of P and As.

Potassium titanyl phosphate belongs to the orthorhombic point group mm2 (space group $Pna2_1$) which lacks a center of symmetry. This material can be phase-matched for the conversion of cavity radiation having a wavelength of 1064 nm to its second harmonic which has a wavelength of 532 nm. For this frequency conversion, the potassium titanyl phosphate crystal can be oriented for a Type II interaction with cavity radiation propagating along a phase-match axis within the crystallographic xy-plane, 24 ±2° off the crystallographic x-axis and perpendicular to the crystallographic z-axis.

The laser illustrated by FIG. 1 is provided with temperature control means for adjusting and controlling the temperature of the laser's optical cavity and its contents. This temperature control means can be of any conventional type, for example, an electrically powered resistance heater or thermoelectric device, and is used to maintain the temperature of the optical cavity at a value which results in substantially noise-free generation of output radiation 11. Through the use of such temperature control means, the temperature of the cavity and its contents are desirably maintained at ±1° C. of the selected value, preferably at ±0.5° C. of the selected value and more preferably at ±0.1° C. of the selected value.

The undesired fluctuations in the amplitude of output radiation 11, for example, within a frequency range of about 1 kHz to about 50 MHz, are referred to as noise and are conveniently measured as percent root mean square (% RMS) noise. Although an intracavity frequency-modified laser of improved amplitude stability is obtained through the substantial elimination of spatial hole burning in the lasant material 6, we have found that the noise content of output radiation 11 drops essentially to zero over certain temperature ranges. More specifically, if the noise content of output radiation 11 is measured as a function of the temperature of the laser cavity, certain ranges of temperature or "temperature windows" are observed over which the noise drops to essentially zero. The width of these windows and the precise temperatures at which they occur are different for each individual laser. That is to say, even if a substantial effort is made to construct two completely identical lasers, we have found that they will be sufficiently different that the noise content of output radiation 11 as a function of the temperature of the laser cavity will be a unique characteristic of each device. However, for a given laser, the noise content of the output radiation 11 as a function of temperature does not change significantly over long periods of time (for example, weeks or months) or with repeated cycling over large temperature ranges. Accordingly, a highly preferred embodiment of this invention comprises locating a window of substantially free operation for a laser by measuring the noise content of output radiation 11 as a function of the temperature of the optical cavity and maintaining the temperature of the laser cavity at a value within such a window during subsequent operation. These windows of substantially noise-free operation are typically from about 1° to about 15° C. wide, and within such a window the % RMS noise will typically be less than about 0.2% and frequently less than about 0.1%. The windows of substantially noise-free operation are easily identified by measuring the noise content of output radiation 11 over any range of temperatures which is convenient from an operating point of view, for example, from about 0° to about 100° C., or more conveniently, from about 30° to about 65° C. This measurement is desirably carried out over a range of at least about 5° C. and preferably over a range of at least about 10° C. or 20° C. in order to give a reasonable sampling of the laser's temperature-related performance.

In a specific example of the embodiment illustrated in FIG. 1, neodymium-doped YAG is used as lasant material 6, and the nonlinear optical crystal 9 is composed of potassium titanyl phosphate. The neodymium-doped YAG is optically pumped by a multistripe laser diode array 3 which is attached to a thermoelectric cooler 2 (the array and attached thermoelectric cooler is a Model SDL 2422-Hl device manufactured by Spectra Diode Labs of San Jose, Calif.). The laser diode array 3 is a 10-stripe array consisting of 3 micron stripes on 10 micron centers which can provide about 200 mW of pumping radiation 1 having a wavelength of about 810 nm. This pumping radiation 1 is focused by gradient index lens 4 which has a 0.29 pitch and is antireflection coated with respect to 810 nm wave-length radiation. The focused pumping radiation passes through quarter-wave retardation plate 5 which is comprised of quartz and is in the form of a circular plate having a thickness of about 1 mm and a 10 mm diameter. Input face 8 of quarter-wave plate 5 carries a multilayer dielectric coating which is highly reflective (R > 99.8%) at a wavelength of 1064 nm and highly transparent (T > 80%) at a wavelength of 810 nm. Output face 12 of quarter-wave plate 5 carries an antireflection coating (R < 0.2%) for light having a wavelength of 1064 nm and highly transparent (T > 80%) at a wavelength of 810 nm. The focused pumping radiation comes to a focus within lasant material 6 which contains about 1% neodymium and is in the form of a rod having a 4 mm length and a 10 mm diameter. The lasant material 6 is oriented for low threshold operation at a wavelength of 1064 nm and emits light (cavity radiation) having a wavelength of 1064 nm in response to excitation by the pumping radiation. The surfaces of lasant material 6 are antireflection coated (R < 0.2%) for light having a wavelength of 1064 nm and highly transparent (T > 80%) at a wavelength of 810 nm. Nonlinear optical crystal 9 is a rhombohedral prism of potassium titanyl phosphate which has dimensions of 1×1×3 mm (with a 3 mm interaction length with the cavity radiation) and is cut for Type II phase-matched conversion of cavity radiation to its second harmonic having a wavelength of 532 nm. Nonlinear optical crystal 9 is antireflection coated with respect to both 532 nm and 1064 nm wavelength radiation. Nonlinear optical crystal 9 and quarter-wave plate 5 are positioned in such a manner that the crystallographic z-axis of crystal 9 is parallel to the optic axis of quarter-wave plate 5 about the axis along which they encounter cavity radiation. Quarter-wave plate 10 is identical with plate 5 except that both of its surfaces are antireflection coated with respect to 1064 nm wavelength radiation and it is desirably a half-wave plate or full-wave plate for 532 nm wavelength radiation Quarter-wave plate 5 and 10 are positioned in such a manner that the optic axis of one makes a 45° angle with respect to the optic axis of the other about the axis along which they encounter cavity radiation. Output radiation 11 having a frequency of 532 nm is transmitted through mirror 7 which has a radius of curvature of 10cm and carries a dielectric coating which is highly reflective (R > 99.8%) at a wavelength of 1064 nm and highly transparent at a wavelength of 532 nm. The optical cavity of this laser has a length (distance from surface 8 to mirror 7) of about 20 mm. The optical cavity was wrapped with an electrically powered resistance heater and fitted with a thermistor which could be used to: (a) measure the cavity temperature; and (b) control the cavity temperature by providing a feedback signal to the power supply for the resistance heater.

Figure 2:
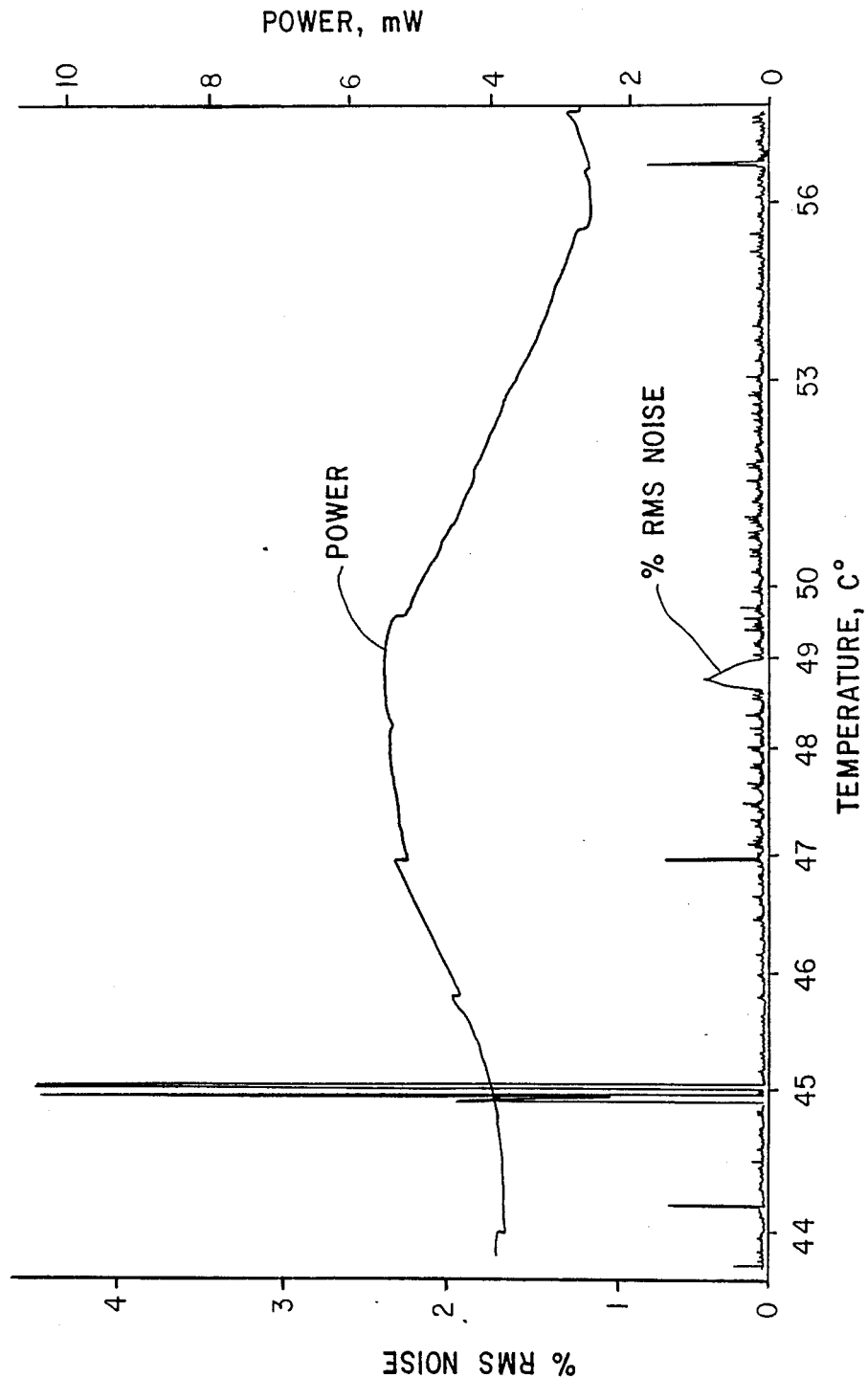
FIG. 2 of the drawings illustrates the optical output power of a frequency-doubled, laser diode pumped, solid state laser of the type illustrated by FIG. 1 and the root mean square (RMS) noise content of said output as a function of the temperature of the laser cavity.

The power and percent root mean square (RMS) noise of the 532 nm output radiation from the above-described laser were measured as a function of temperature over the range from about 40° to about 60° C. The results are set forth in FIG. 2. With reference to FIG. 2, it will be noted that the RMS noise in the output radiation drops essentially to zero over certain ranges of temperature or "temperature windows." For example, such a window appears at about 46.0°–48.6° C. and another appears at about 49.0°–56.4° C. The precise location and width of these windows of substantially noise-free operation are unique characteristics of each individual laser and do not change significantly with time (for example, weeks or months) or repeated temperature cycling over several tens of degrees centigrade. Accordingly, each laser can be made to operate in a substantially noise-free manner by maintaining the optical cavity of the device at a temperature within such a window during operation. Although the reason for the existence of these temperature windows is uncertain, it is believed that the longitudinal mode configuration within the optical cavity undergoes change or fluctuation when significant RMS noise is observed—possibly as a result of temperature-induced changes in the optical cavity length and component birefringence together with associated etalon effects.

It will also be noted from FIG. 2 that the output power is also a function of cavity temperature. Accordingly, a preferred embodiment of the invention involves selecting a temperature window which yields: (a) substantially noise-free operation; and (b) relatively high output power.

FIG. 3 schematically illustrates a second embodiment of the invention which involves the use of a traveling-wave ring-like optical cavity for the purpose of substantially eliminating spatial hole burning in the lasant material. With reference to FIG. 3, optical pumping radiation 21 from laser diode array 22 is focused by focusing means 23 into lasant material 24 which is capable of being pumped by said pumping radiation. Laser diode array 22 is attached to heat sink 25. Light emitted by the lasing of lasant material 24 is contained within the optical cavity defined by mirrors 26, 27 and 28 and by a suitable reflective coating on surface 29 of lasant material 24, and such light is hereinafter referred to as cavity radiation. A unidirectional optical gate means for effecting unidirectional circulation of cavity radiation within the optical cavity is provided by the combination of polarizer 30, Faraday rotator 31, and half-wave plate 32. Nonlinear optical crystal 33 is positioned within the optical cavity in such a manner that cavity radiation circulating within the optical cavity can interact with the crystal along a phase-match axis for the conversion of cavity radiation into radiation which is a harmonic thereof. Harmonic radiation is generated upon interaction of the cavity radiation with nonlinear optical crystal 33 and is passed through mirror 28 as output radiation 34. Finally, the laser illustrated in FIG. 3 is provided with temperature control means (which is not shown in FIG. 3) for adjusting and controlling the temperature of the optical cavity and its contents. This temperature control means is employed to maintain the optical cavity of the laser at a value which results in substantially noise-free generation of output radiation 34.

The reflective coating on surface 29 of lasant material 24 is selected in such a manner that it is substantially transparent to optical pumping radiation 21 but highly reflective with respect to the cavity radiation produced by the lasing of lasant material 24. Mirrors 26 and 27 are highly reflective for the cavity radiation produced by the lasing of lasant material 24. Mirror 28 is highly reflective for cavity radiation but substantially transparent to output radiation 34 which is generated by the interaction of cavity radiation with nonlinear optical crystal 33.

Any conventional polarization means can be utilized as polarizer 30, for example, a Brewster plate, suitable coatings on the mirrors of the optical cavity, a dielectric polarizer, or a Brewster angle surface on the lasant material 24.

If neodymium-doped YAG is used as the lasant material 24, the YAG crystal itself can also serve as Faraday rotator 31 if a magnetic field is established along the axis of the crystal. In such an embodiment, a separate Faraday rotator 31 is not required.

Conventional designs for a traveling-wave optical cavity which can be employed in the practice of this invention for the purpose of substantially eliminating spatial hole burning in the lasant material are set forth in W. Koechner, *Solid-State Laser Engineering* (Springer-Verlag, New York, Second Ed., 1988) at pp. 126-128 and in Siegman, *Lasers* (University Science Books, Mill Valley, Calif., 1986) at pp. 532–538.

We claim:
1. An optically pumped solid state laser comprising:
   (a) an optical cavity for optical radiation of a first frequency;
   (b) optical pumping means for generating optical pumping radiation which comprises a laser diode;
   (c) solid lasant material which is disposed within said optical cavity, positioned to receive pumping radiation from said optical pumping means, and effective for generating coherent optical radiation of said first frequency upon receiving said pumping radiation;
   (d) means for substantially eliminating spatial hole burning in the lasant material during said generation of optical radiation of a first frequency;
   (e) nonlinear optical means within the optical cavity for converting said optical radiation of a first frequency into coherent optical radiation of a second frequency; and
   (f) temperature control means for maintaining the temperature of said optical cavity at a value within a range, which results in substantially noise-free generation of said radiation of a second frequency.

2. The laser of claim 1 wherein the optical cavity is a standing wave cavity for said radiation of a first frequency.

3. The laser of claim 2 wherein the optical cavity is a linear standing wave cavity for said radiation of a first frequency.

4. The laser of claim 2 wherein said means for eliminating spatial hole burning comprises a pair of quarter-wave plates within said optical cavity.

5. The laser of claim 4 wherein said lasant material and nonlinear optical means are positioned between said quarter-wave plates.

6. The laser of claim 1 wherein said optical cavity is of a ring-type and said means for eliminating spatial hole burning comprises unidirectional optical gate means for effecting unidirectional circulation of said radiation of a first frequency within the optical cavity.

7. The laser of claim 6 wherein said unidirectional optical gate means is comprised of a polarizer, a half-wave plate, and a Faraday rotator.

8. The laser of claim 1 wherein said second frequency is twice that of said first frequency.

9. The laser of claim 1 wherein said radiation of a first frequency is comprised of at least two longitudinal modes.

10. The laser of claim 1 wherein said nonlinear optical material is comprised of potassium titanyl phosphate.

11. The laser of claim 1 wherein said lasant material is comprised of neodymium-doped YAG.

12. A method for generating coherent optical radiation which comprises:
  (a) generating coherent optical radiation of a first frequency from solid lasant material within an optical cavity for said radiation of a first frequency;
  (b) substantially preventing spatial hole burning in the lasant material during said generation of radiation of a first frequency with spatial hole burning suppression means;
  (c) converting said optical radiation of a first frequency into coherent optical radiation of a second frequency within said optical cavity with nonlinear optical means;
  (d) withdrawing said optical radiation of a second frequency from said optical cavity as output radiation;
  (e) measuring the noise in said output radiation as a function of the temperature of said optical cavity;
  (f) determining a temperature range for said optical cavity over which said output radiation is substantially noisefree; and
  (g) maintaining the temperature of said optical cavity at a value which is within said determined temperature range during subsequent production of said output radiation.

13. The method of claim 12 wherein said second frequency is twice that of said first frequency wherein said temperature range is determined by measuring the noise content of said radiation of a second frequency as a function of the temperature of said optical cavity.

14. The method of claim 12 wherein said radiation of a first frequency is comprised of at least two longitudinal modes.

15. The method of claim 12 wherein the optical cavity is a standing wave cavity for said radiation of a first frequency.

16. The method of claim 15 wherein the optical cavity is a linear standing wave cavity for said radiation of a first frequency.

17. The method of claim 15 wherein said spatial hole burning suppression means comprises a pair of quarter-wave plates within said optical cavity.

18. The method of claim 17 wherein said lasant material and nonlinear optical means are positioned between said quarter-wave plates.

19. The method of claim 12 wherein said optical cavity is of a ring-type and said means for eliminating spatial hole burning comprises unidirectional optical gate means for effecting unidirectional circulation of said radiation of a first frequency within the optical cavity.

20. The method of claim 6 wherein said unidirectional optical gate is comprised of a polarizer, a halfwave plate, and a Faraday rotator.

21. The method of claim 12 which additionally comprises optically pumping said lasant material with optical pumping means wherein said optical pumping means comprises a laser diode.

22. The method of claim 21 wherein said optical pumping means comprises a laser diode array.

* * * * *

UNITED STATES PATENT AND TRADEMARK OFFICE
CERTIFICATE OF CORRECTION

PATENT NO. : 4,933,947

DATED : June 12, 1990

INVENTOR(S) : Douglas W. Anthon, et. al.

Page 1 of 2

It is certified that error appears in the above-identified patent and that said Letters Patent is hereby corrected as shown below:

It is certified that error appears in the above-identified patent and that said Letters Patent are hereby corrected as shown below:

Column 7, lines 53 & 54, "lensshaped" should read --lens-shaped--.

Column 8, lines 54 & 55, "travelingwave" should read --traveling-wave--.

Column 9, line 12, "$KB_5O_8.4H_2O$" should read --$KB_5O_8 \cdot 4H_2O$--.

Column 10, line 35, "wave-length" should read --wavelength--.

Column 11, lines 5 & 6, "radiation Quarter-wave" should read --radiation. Quarter-wave--.

Column 13, line 2, "frequency." should read --frequency; wherein said temperature range is determined by measuring the noise content of said radiation of a second frequency as a function of the temperature of said optical cavity.--.

Column 14, line 8, "noisefree" should read --noise-free--.

Column 14, lines 14 through 17, "first frequency wherein said temperature range is determined by measuring the noise content of said radiation of a second frequency as a function of the temperature of said optical cavity." should read --first frequency.--.

UNITED STATES PATENT AND TRADEMARK OFFICE
CERTIFICATE OF CORRECTION

PATENT NO.   : 4,933,947
DATED        : June 12, 1990
INVENTOR(S)  : Douglas W. Anthon, et. al.

It is certified that error appears in the above-identified patent and that said Letters Patent is hereby corrected as shown below:

Column 14, line 39, "of claim 6" should read --of claim 19--.

Column 14, line 40, "halfwave" should read --halfway-wave--.

Signed and Sealed this

First Day of September, 1992

Attest:

DOUGLAS B. COMER

*Attesting Officer*    Acting Commissioner of Patents and Trademarks